United States Patent
Keyes et al.

(10) Patent No.: US 6,547,908 B2
(45) Date of Patent: Apr. 15, 2003

(54) METHOD OF MANUFACTURING A THERMOPLASTIC TUBULAR JACKET

(75) Inventors: Thomas Joseph Keyes, Ft. Worth, TX (US); James Bass, Ft. Worth, TX (US)

(73) Assignee: Thermacor Process, Inc., Fort Worth, TX (US)

( * ) Notice: Subject to any disclaimer, the term of this patent is extended or adjusted under 35 U.S.C. 154(b) by 0 days.

(21) Appl. No.: 09/918,627

(22) Filed: Jul. 30, 2001

(65) Prior Publication Data

US 2003/0020207 A1 Jan. 30, 2003

(51) Int. Cl.⁷ .................... B65H 81/00; B32B 31/00
(52) U.S. Cl. .................. 156/155; 156/184; 156/191; 156/192; 156/244.13
(58) Field of Search ................... 156/184, 192, 156/191, 195, 244.11, 155, 244.13, 244.24

(56) References Cited

U.S. PATENT DOCUMENTS

| | | |
|---|---|---|
| 3,979,818 A | 9/1976 | Groch et al. |
| 4,941,527 A | 7/1990 | Toth et al. |
| 5,076,352 A | 12/1991 | Rosenfeld et al. |
| 5,411,619 A | 5/1995 | Sundqvist et al. |
| 5,601,881 A | 2/1997 | Grimm et al. |
| 5,642,776 A | 7/1997 | Meyer, IV et al. |
| 5,900,195 A | 5/1999 | Pool et al. |

FOREIGN PATENT DOCUMENTS

| | | | |
|---|---|---|---|
| DE | 2037152 A | * | 2/1972 |
| EP | 1010513 A2 | * | 6/2000 |

* cited by examiner

*Primary Examiner*—Jeff H. Aftergut
(74) *Attorney, Agent, or Firm*—Bracewell & Patterson, L.LP.

(57) ABSTRACT

A method is shown for manufacturing a polyethylene jacket of the type used in pre-insulated piping systems. A mandrel is first coated with a brittle polymeric coating. A melt profile of polyethylene is then extruded onto the mandrel and spirally wound to produce adjacent windings. The adjacent windings make contact to form a finished jacket which is in engagement with the brittle coating. After the jacket has set, an external compressive force is applied to the tubular member thus formed sufficient to crush the internal brittle coating, thereby freeing the polyethylene jacket from engagement with the mandrel. The jacket can then be removed from the mandrel.

4 Claims, 1 Drawing Sheet

METHOD OF MANUFACTURING A THERMOPLASTIC TUBULAR JACKET

BACKGROUND OF THE INVENTION

1. Field of the Invention

The present invention relates generally to a method for forming a thermoplastic tubular jacket and, more specifically, to a method of manufacturing a polyethylene jacket useful as an outer protective jacket for an insulated pipe.

2. Description of the Prior Art

There are many instances in which insulated pipelines are needed. For example, distributed HVAC (heating, ventilation and air conditioning) applications utilize chilled water for cooling and steam for heating. The chiller and boiler are typically contained in a central location and the chilled water and steam are distributed to other locations. For example, on a school campus, the chiller and boiler may be located in a power plant building. The chilled water and steam are distributed to classrooms in separate buildings.

A set of insulated pipelines is used to convey the chilled water from the chiller to other locations and back to the chiller. Another set of insulated pipelines is used to carry the steam from the boiler to the other locations and back to the boiler. The insulated pipelines are usually located underground.

Insulated pipe is conventional and commercially available. One type of insulated pipe uses a steel pipe to convey fluid. Around the outside of the steel pipe is a layer of insulating foam such as, for example, polyurethane foam. Around the outside of the foam is a jacket of hard thermoplastic (such as high density polyethylene, HDPE). The plastic jacket protects the foam from mechanical damage and also provides a water tight seal to prevent corrosion of the steel pipe.

HDPE jackets are commercially available from a number of sources. However, a need exists for a simpler and more economical method for producing such jackets.

SUMMARY OF THE INVENTION

The present invention has as its object to provide a simpler and more economical method for producing thermoplastic tubular jackets. The present method is simple to carry out and produces, for example, HDPE tubular jackets at reduced cost for incorporation into pre-insulated piping.

In the method of forming a thermoplastic tubular member of the invention, a mandrel is provided having an exposed surface area. The mandrel is coated with a destructible coating which substantially covers the exposed surface area. A hot melt profile of thermoplastic material is then extruded onto the previously applied destructible coating and is spirally wound along the mandrel to produce adjacent windings. The adjacent windings of the melt profile are arranged to make contact to form a continuous tubular member on the mandrel which surrounds the destructible coating. After the melt profile has cooled, an external force is applied to the tubular member sufficient to destroy the integrity of the destructible coating whereby the tubular member so formed can be extracted from the mandrel.

Preferably, a rotatable mandrel is used in the method which is coated with a friable coating. The friable coating can be, for example, a high temperature polyurethane foam. After the melt profile has been extruded and spirally wound over the friable coating, an external compressive force is applied to the tubular member in order to crush the friable coating. The external compressive force can be applied, for example, by series of rollers located on a production line downstream from the point at which the melt profile is extruded.

Additional objects, features and advantages will be apparent in the written description which follows.

DETAILED DESCRIPTION OF THE INVENTION

Figure 1:
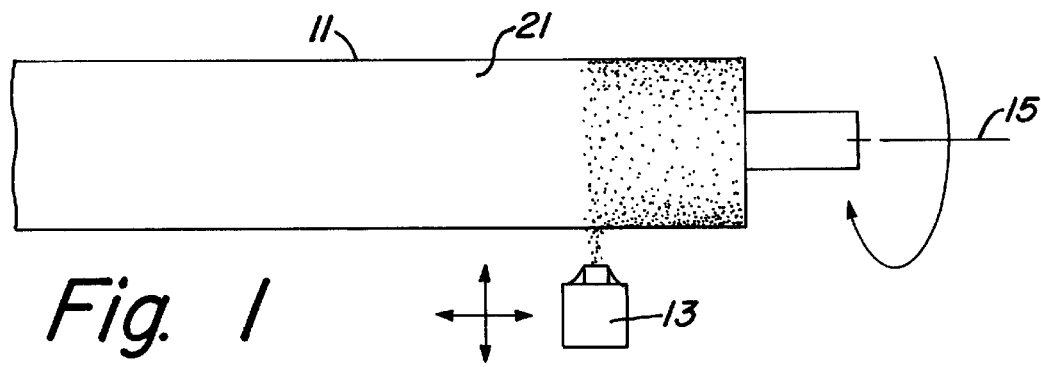
FIG. 1 is a simplified, side view of the first step of the method of the invention in which a friable coating is applied to the exterior of the mandrel.
Figure 2:
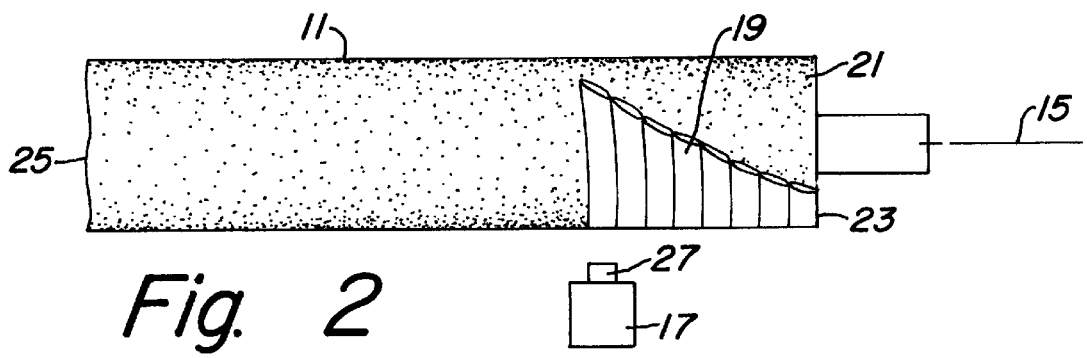
FIG. 2 is a view similar to FIG. 1 showing the next step in the method in which a melt profile of thermoplastic material is extruded and spirally wound onto the mandrel, portions of the profile being broken away for ease of illustration.

At the present time, all polyethylene jackets used in the pre-insulated pipe industry are manufactured in the same way that polyethylene pressure pipe is manufactured. That is, they are extruded in cylindrical form in a vacuum chamber and produced in continuous diameters of various required sizes. The present method provides a simple and economical alternative for manufacturing a polyethylene jacket of this type. The present method utilizes a simple working body such as a laterally and rotatably driven, heated mandrel (11 in FIG. 1) instead of utilizing a complicated and expensive extrusion line with multiple extrusion heads. In a first step of the present method, the mandrel 11 is coated with a destructible material such as a brittle or friable polymeric coating. The mandrel is heated to a constant temperature of approximately 110° F. before applying the friable coating so that a heat resistive coating will be exposed to a constant temperature and will rise evenly. The preferred brittle or friable materials are porous, cellular structures which collapse into dust or small particulates upon the application of an external compressive force. These materials can be, for example, commercially available polyurethane or polyisocyanurate foams. One suitable material is a high temperature (400° F.) polyisocyanurate foam. The friable foam material is applied by means of an spray nozzle 13 (FIG. 1) with lateral relative movement taking place in the direction of the axis of rotation 15. In other words, the mandrel 11 is moving laterally along the axis 15 as well as rotating about the axis 15 while the spray nozzle 13 is stationary. Using the friable coating of the invention, it is not generally necessary to utilize either a release agent or release foil. The friable coating is on the order of ⅛ inch to 1 inch, most preferably about ¼ inch in thickness in the preferred example.

In the next step of the method, the heated mandrel 11 is again rotated and moved laterally along the axis 15 whereby a relative movement takes place in the direction in the axis of rotation 15 between the mandrel 11 and an extruder nozzle 17 which extrudes a thermoplastic polymeric material, preferably a polyolefin such as a polyethylene, polypropylene or polybutylene. The nozzle 17 can be of the sheet line type. The preferred thermoplastic polymeric material is a polyethylene such as a high density polyethylene. Because of the relative movement between the stationary applicator head 17 and mandrel 11, the application is effected in helical convolutions. The polyethylene is extruded onto the foam covered mandrel at approximately 400° F. with each successive lap melting into the previous lap, thereby forming a continuous jacket. If desired, a distance slightly less than the width of the melt profile can be employed such that a minimal amount of overlapping is obtained. In this way, a spiral winding of the melt profile 19 around the mandrel 11 is obtained with winding turns located tightly one above the other such that a welding together of the melt profiles is obtained. In other applications, the adjacent windings of the melt profile are merely arranged to make contact to form a jacket on the mandrel which surrounds and is in engagement with the brittle coating previously applied. By whatever means, a continuous layer or jacket or thermoplastic material is obtained on the mandrel.

Figure 3:
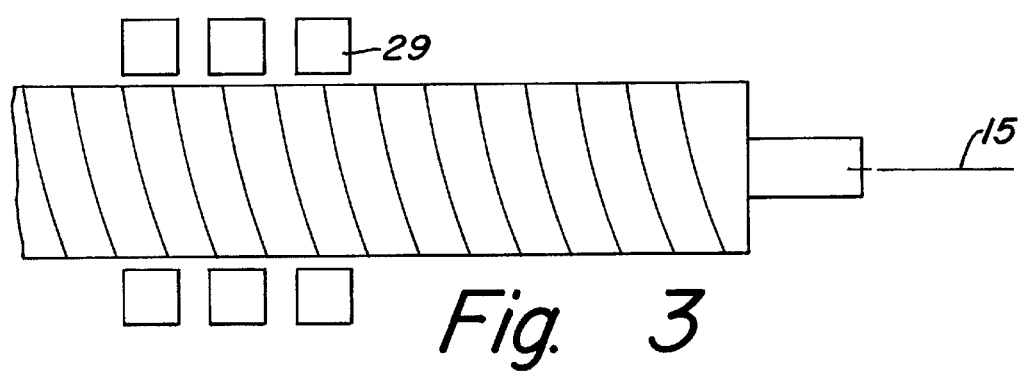
FIG. 3 is a simplified view similar to FIG. 2 showing the next step in the method in which rollers are used to apply a compressive force to the previously formed tubular member in order to crush the internal friable coating.

In order to remove the polyethylene jacket from the mandrel, an external compressive force is then applied to the tubular jacket while the jacket is still on the mandrel. The external compressive force, as shown in FIG. 3, can be applied by a simple series of rollers 29 which are arranged about the exterior of the mandrel and tubular member. A selected one of the rollers 29 or mandrel 11 are moved along the axis of rotation 15 so that a "rolling pin" effect is applied along the length of the jacket as well as about the circumference thereof. The compressive force serves to crush the internal friable coating layer, thereby freeing the polyethylene jacket from engagement with the mandrel. The polyethylene jacket so formed can then be removed by pulling jacket longitudinally along the axis 15 until the jacket clears the mandrel.

The removal of the tubular jacket from the mandrel may be facilitated by blowing pressurized air between the mandrel and jacket, via small gaps or holes contained in the mandrel or from one end thereof, at the same time that a pushing force is directed onto the pipe in a direction along the axis 15.

Figure 4:
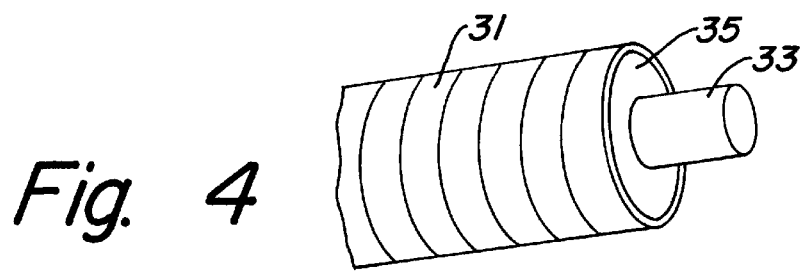
FIG. 4 is a side view, partly broken away of an insulated pipe featuring the thermoplastic tubular jacket formed by the method of the invention.

FIG. 4 shows a completed pre-insulated pipe incorporating the jacket 31 of the invention. The steel pipe 33 is surrounded by a layer of expanded and set polyurethane foam 35. The polyethylene jacket 31, in turn, surrounds the polyurethane insulating layer. The jacket is first separated from the steel pipe 33 by suitable centralizers (not shown) and the polyurethane foam insulating material is blown into the region illustrated as 35 in FIG. 4 and allowed to set.

An invention has been provided with several advantages. The present method does not require the use of complicated and expensive extrusion lines with multiple extrusion die heads, vacuum chambers, and the like, of the type presently used in manufacturing polyethylene pipe. The present method provides a simple and economical alternative for manufacturing a polyethylene jacket of the above type. The use of a destructible coating as a preliminary step eliminates the need for a release agent or release foil and allows the polyethylene jacket to be easily removed from the mandrel. The friable coating can be a thin (⅛ inch to 1 inch) layer of polyurethane or polyisocyanurate foam. The foam can be crushed by applying a simple mechanical compressive force to the exterior of the tubular jacket, thereby destroying the integrity of the temporary coating layer and freeing the jacket from the mandrel exposed surface. The jacket is then allowed to slide off the mandrel.

While the invention has been shown in one of its forms, it is not thus limited but is susceptible to various changes and modifications without departing from the spirit thereof.

What is claimed is:

1. A method of insulating a fluid conveying pipe, the method comprising the steps of:

providing a rotatable and laterally movable mandrel;

coating the rotatable mandrel with a brittle polymeric coating:

extruding a melt profile of a polyolefin material onto the mandrel and spirally winding the melt profile around the mandrel while both rotating the mandrel and moving the mandrel laterally to produce adjacent windings, the adjacent windings of the melt profile being arranged to make contact to form a polyolefin jacket on the mandrel which is in engagement with the brittle coating;

applying an external compressive force to the tubular member thus formed while the member is still on the mandrel sufficient to crush the brittle coating, thereby freeing the polyolefin jacket from engagement with the mandrel;

removing the polyolefin jacket so formed from the mandrel;

positioning the polyolefin jacket in spaced relationship about a fluid conveying pipe to be insulated;

filling the space between the jacket and pipe with an insulating material.

2. The method of claim 1, wherein the polyolefin is polyethylene.

3. The method of claim 1, wherein the insulating material is a polyurethane insulating material.

4. The method of claim 1, wherein the brittle polymeric coating is a brittle, high temperature polyisocyanurate material.

* * * * *